(12) United States Patent
Booth et al.

(10) Patent No.: US 7,872,470 B2
(45) Date of Patent: Jan. 18, 2011

(54) MOTOR SPEED SENSOR ASSEMBLY FOR DETECTING ROTATIONAL DIRECTION AND SPEED

(75) Inventors: Thomas L. Booth, Birmingham, MI (US); Kevin P. O'Connor, Lake Mills, WI (US)

(73) Assignee: STRATTEC Power Access LLC, Troy, MI (US)

( * ) Notice: Subject to any disclaimer, the term of this patent is extended or adjusted under 35 U.S.C. 154(b) by 923 days.

(21) Appl. No.: 11/746,352

(22) Filed: May 9, 2007

(65) Prior Publication Data

US 2008/0083168 A1 Apr. 10, 2008

Related U.S. Application Data

(63) Continuation-in-part of application No. 11/431,914, filed on May 10, 2006, now Pat. No. 7,242,180.

(60) Provisional application No. 60/820,755, filed on Jul. 28, 2006, provisional application No. 60/825,228, filed on Sep. 11, 2006.

(51) Int. Cl.
*G01B 7/30* (2006.01)
*G01P 3/44* (2006.01)

(52) U.S. Cl. .................... 324/207.2; 324/165; 324/173; 324/207.25

(58) Field of Classification Search ........................ None
See application file for complete search history.

(56) References Cited

U.S. PATENT DOCUMENTS

| 5,046,283 | A | * | 9/1991 | Compeau et al. | 49/138 |
| 5,313,795 | A | * | 5/1994 | Dunn | 60/413 |
| 5,319,880 | A | * | 6/1994 | Kuhlman | 49/360 |
| 5,319,881 | A | * | 6/1994 | Kuhlman | 49/360 |
| 2003/0173955 | A1 | * | 9/2003 | Uenoyama | 324/207.21 |
| 2003/0222642 | A1 | * | 12/2003 | Butzmann | 324/207.21 |
| 2007/0252590 | A1 | * | 11/2007 | Kondo | 324/207.25 |

OTHER PUBLICATIONS

U.S. Appl. No. 11/400,250, filed Apr. 7, 2006.

* cited by examiner

*Primary Examiner*—Jay M Patidar
(74) *Attorney, Agent, or Firm*—Michael Best & Friedrich LLP (57) ABSTRACT

A drive assembly for a vehicle door is provided. The drive assembly includes a motor having a driving member. The drive assembly further includes a housing having a shaft rotatably received therein. The drive assembly further includes an input member being rotatably received upon the shaft. The input member is operatively associated with the driving member. The drive assembly further includes a rotor fixedly secured to the shaft. The drive assembly further includes first and second Hall effect sensor modules mounted to the housing in a facing spaced relationship with respect to the plurality of teeth of the rotor that generate first and second signals, respectively. The first and second signals have a quadrature relationship with respect to one another and indicate a rotational direction of the rotor when the plurality of teeth are rotating past the first and second Hall effect sensor modules.

8 Claims, 5 Drawing Sheets

MOTOR SPEED SENSOR ASSEMBLY FOR DETECTING ROTATIONAL DIRECTION AND SPEED

CROSS REFERENCE TO RELATED APPLICATIONS

This application is a continuation-in-part of U.S. nonprovisional patent application Ser. No. 11/431,914 filed on May 10, 2006, the contents of which are incorporated herein by reference thereto.

This application claims the benefit of U.S. provisional patent application Ser. No. 60/820,755, filed on Jul. 28, 2006, and U.S. provisional patent application Ser. No. 60/825,228, filed on Sep. 11, 2006, the contents each of which ate incorporated herein by reference thereto.

This application is also related to U.S. nonprovisional application Ser. No. 11/400,250, filed on Apr. 7, 2006, the contents of which are incorporated herein by reference thereto.

BACKGROUND

Power sliding door (PSD) and the power lift gate (PLG) systems are used in some vehicles to power open and close the doors. The systems require an electronic control unit (ECU) that controls a motor coupled to a door or a lift gate to move the door or lift gate in a desired direction at a desired speed. To accomplish this functionality, the ECU needs information regarding the motor rotational direction and motor speed. A sensor has been utilized to detect movement of a motor, however, the sensor is not able to output signals indicative of a motor rotational direction and a motor speed by detecting closely spaced gear teeth associated with a rotor coupled to the motor.

Accordingly, the inventors herein have determined a need for an improved drive assembly for a vehicle door that utilizes Hall effect sensor modules to determine a rotational direction and a rotational speed of a rotor operably coupled to a motor.

SUMMARY OF THE INVENTION

A drive assembly for a vehicle door in accordance with an exemplary embodiment is provided. The drive assembly includes a motor having a driving member. The drive assembly further includes a housing having a shaft rotatably received therein. The drive assembly further includes an input member being rotatably received upon the shaft. The input member is operatively associated with the driving member, and rotation of the driving member causes rotation of the input member. The drive assembly further includes an armature mounted on the input member. The drive assembly further includes a rotor fixedly secured to the shaft. The rotor has cylindrical in shape and has a plurality of teeth positioned along a periphery of the rotor. The plurality of teeth are positioned in an equidistant manner and define a plurality of tooth valleys and a plurality of tooth peaks. The plurality of tooth peaks and the plurality of tooth valleys are arranged in an alternating manner. The drive assembly further includes a coil mounted to the housing. The coil provides magnetic flux lines through the rotor to attract the armature when the coil is provided with an excitation thereby coupling the input member to the rotor. The drive assembly further includes a first Hall effect sensor module mounted to the housing in a facing spaced relationship with respect to the plurality of teeth of the rotor. The first Hall effect sensor module has first and second Hall effect sensor elements. The first and second Hall effect sensor elements are spaced apart from one another and centered along a first axis. The first axis is at a first predetermined angle with respect to leading edges of the plurality of teeth of the rotor. The first and second Hall effect sensor elements cooperate with one another to generate a first signal indicating whether one of the plurality of tooth peaks or one of the plurality of tooth valleys are detected. The drive assembly further includes a second Hall effect sensor module mounted to the housing in a facing spaced relationship with respect to the plurality of teeth of the rotor. The second Hall effect sensor module has third and fourth Hall effect sensor elements. The third and fourth Hall effect sensor elements are spaced apart from one another and centered along a second axis. The second axis is at a second predetermined angle with respect to leading edges of the plurality of teeth. The third and fourth Hall effect sensor elements cooperate with one another to generate a second signal indicating whether one of the plurality of tooth peaks or one of the plurality of tooth valleys are detected. The first and second signals have a quadrature relationship with respect to one another and indicate a rotational direction of the rotor when the plurality of teeth are rotating past the first and second Hall effect sensor modules.

A modular system for a vehicle door in accordance with another exemplary embodiment is provided. The modular system includes a track and a door hinge slidably attached to the track. The modular system further includes a drive assembly moving the door hinge along the track. The drive assembly includes a motor having a driving member. The drive assembly further includes a housing having a shaft rotatably received therein. The drive assembly further includes an input member that is rotatably received upon the shaft. The input member is operatively associated with the driving member, wherein rotation of the driving member causes rotation of the input member. The drive assembly further includes an armature mounted on the input member. The drive assembly further includes a rotor fixedly secured to the shaft. The rotor is cylindrical in shape and has a plurality of teeth positioned along a periphery of the rotor. The plurality of teeth are positioned in an equidistant manner and define a plurality of tooth valleys and a plurality of tooth peaks. The plurality of tooth peaks and the plurality of tooth valleys are arranged in an alternating manner. The drive assembly further includes a coil mounted to the housing. The coil provides magnetic flux lines through the rotor to attract the armature when the coil is provided with an excitation thereby coupling the input member to the rotor. The drive assembly further includes a first Hall effect sensor module mounted to the housing in a facing spaced relationship with respect to the plurality of teeth of the rotor. The first Hall effect sensor module has first and second Hall effect sensor elements. The first and second Hall effect sensor elements are spaced apart from one another and centered along a first axis. The first axis is at a first predetermined angle with respect to leading edges of the plurality of teeth of the rotor. The first and second Hall effect sensor elements cooperating with one another to generate a first signal indicating whether one of the plurality of tooth peaks or one of the plurality of tooth valleys are detected. The drive assembly further includes a second Hall effect sensor module mounted to the housing in a facing spaced relationship with respect to the plurality of teeth of the rotor. The second Hall effect sensor module has third and fourth Hall effect sensor elements. The third and fourth Hall effect sensor elements are spaced apart from one another and centered along a second axis. The second axis is at a second predetermined angle with respect to leading edges of the plurality of teeth. The third and fourth Hall effect sensor elements cooperating with one another to generate a second signal indicating whether one of the plurality of tooth peaks or one of the plurality of tooth valleys are detected. The first and second signals have a quadrature relationship with respect to one another and indicate a rotational direction of the rotor when the plurality of teeth are rotating past the first and second Hall effect sensor modules.

DETAILED DESCRIPTION OF EXEMPLARY EMBODIMENTS

Exemplary embodiments of the present invention relate to an apparatus for providing a compact drive device with a sensor assembly for use in vehicular applications. In one exemplary embodiment, the sensor assembly is contemplated for use with a sliding door of a vehicle. In another exemplary embodiment, the sensor assembly is contemplated for use with a lift gate of a vehicle.

In accordance with another non-limiting exemplary embodiment, the sensor assembly described herein was developed for use in the Power Sliding Door (PSD) and the Power Lift Gate (PLG) systems to overcome limitations of the other sensing methods, primarily space limitations in the vehicle and interface restrictions with the ECU. However, the sensor assembly can be applied to any motor or rotating shaft.

In accordance with still another exemplary embodiment, the sensor assembly is configured to detect teeth of a rotor as the rotor rotates past the sensor assembly at varying speeds. The sensor assembly described herein uses a pair of Hall effect sensor modules with a bias magnet to detect ferrous teeth on a rotating wheel such as a rotor for example. The teeth can be in the form of slots in a metal disc, raised teeth on a ring, or teeth on a gear.

Prior apparatus and methods for providing and/or effectuating moving of a sliding door of a vehicle are found in U.S. Pat. Nos. 5,046,283; 5,313,795; 5,319,880; 5,319,881 and 5,323,570 the contents of which are incorporated herein by reference thereto. Other related applications include U.S. patent application Ser. Nos. 10/798,733 and 10/798,792 both filed Mar. 11, 2004, the contents of which are incorporated herein by reference thereto.

Figure 1:
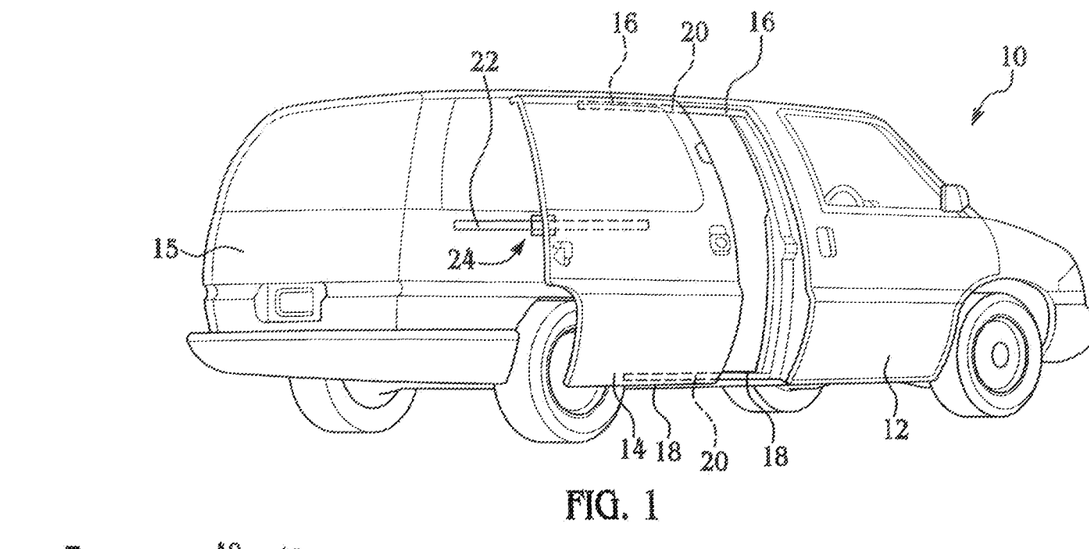
FIG. 1 is a schematic of a vehicle with a sliding door and a lift gate.

Referring now to FIG. 1, a vehicle 10 with a front pivoting door 12 and a power sliding door 14 is illustrated. The vehicle 10 also comprises a lift gate 15. Here and in a non-limiting embodiment, the power sliding door 14 is guided by rollers that are slidably received in an upper track 16 and a lower track 18. The rollers 20 are configured to be received in upper track 16 and lower track 18. In addition to the upper track 16 and the lower track 18, and in accordance with an exemplary embodiment, a center track 22 is also provided. The center track 22 is also configured to receive and engage a roller 20 that is coupled to the sliding door 14. Of course, exemplary embodiments of the present invention are contemplated for use with other sliding door configurations.

Figure 2:
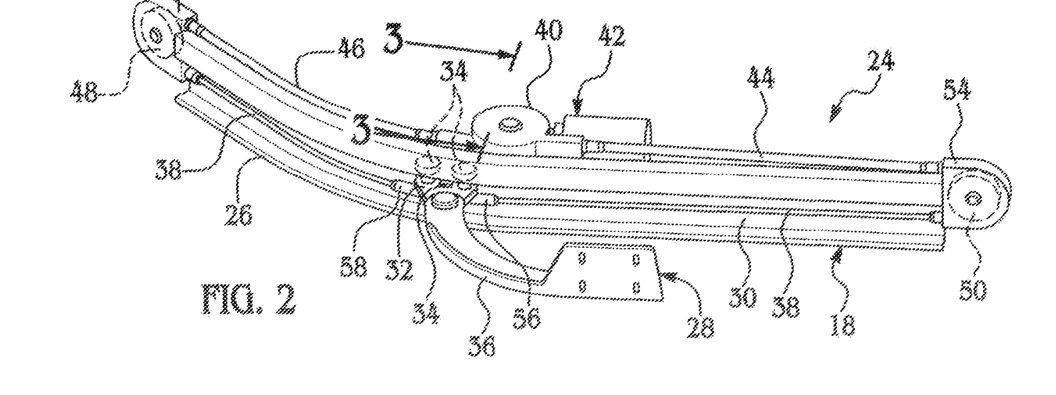
FIG. 2 is a schematic of a modular system having a door track and a drive assembly with a motor drive unit for driving the sliding door of the vehicle of FIG. 1.
Figure 3:
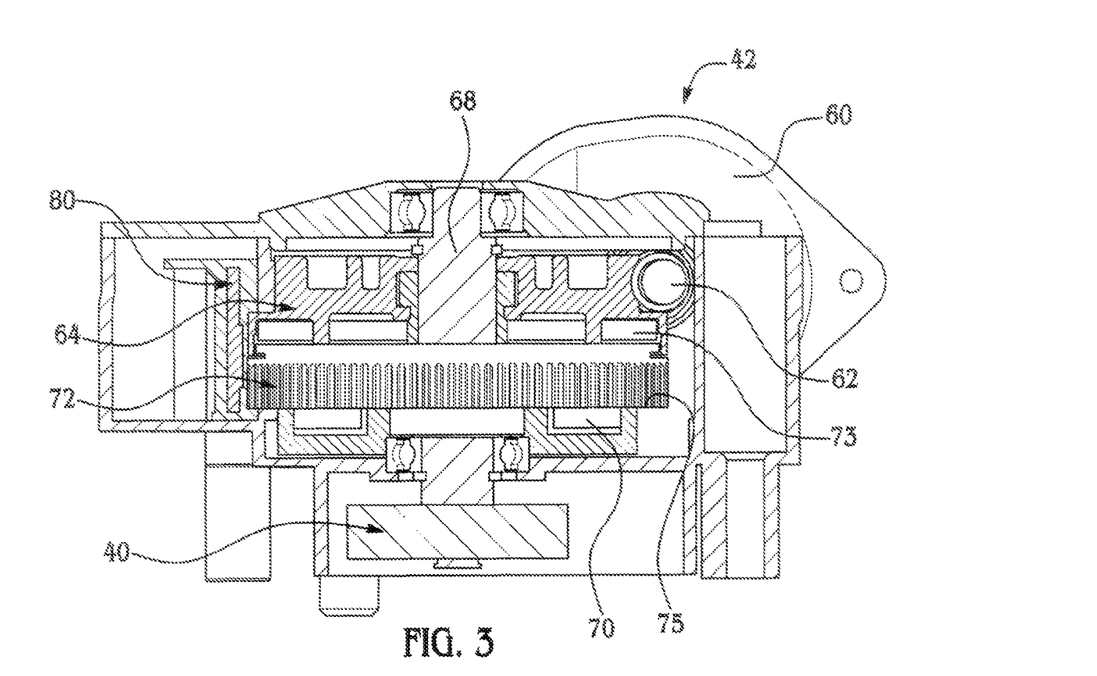
FIG. 3 is a cross-sectional schematic of the modular system of Figure, as taken along line 3-3.

Referring now to FIGS. 2 and 3, a modular power sliding door system is illustrated. As illustrated, a modular system 24 is provided wherein all the drive components are attached to a lower sliding door track and the system 24 is easily installed as a single unit. As shown, the modular system 24 comprises a door track 26 for defining a path of travel for the sliding door. The path of travel defines an open position of the door and a closed position of the door. In accordance with an exemplary embodiment, the system 24 is a cable drive system wherein cables are manipulated to drive a hinge or the hinge assembly 28 which is secured to the sliding door.

The door track 26 defines a channel 30 for slidably receiving a portion 32 or the lower roller hinge 28. The door track 26 can be manufactured out of a steel stamping of any equivalent thereof wherein the curvature of the track is easily defined as well as the configuration of the channel. The door track is configured to be installed as a complete unit into the vehicle 10, which in accordance with one exemplary embodiment will be installed within a cavity of a lower portion of a vehicle defined by a vehicle rocker panel.

One method or means for allowing the portion 32 to be slidably received within the channel 30 is to provide the rollers 34, which will allow the hinge 28 to slide therein. Also, the portion 32 is pivotally secured to a mounting portion 36 of the hinge 28. The pivotal securement of portions 32 and 36 will allow for the proper movement of the sliding door 14 as it moves along the contour of the track 26, which is configured to match the contour of the vehicle 10. It is, of course, understood that the hinge 28 may comprise a single unit with the pivotal movement being facilitated by the securement of one end to the door 14 and the other end to the track.

In an exemplary embodiment, a pair of cables 38 are secured to the hinge 28. One cable 38 is secured to a forward side of the hinge 28 and the other is secured to the rearward side of the hinge 28 and the other ends of the cables 38 are each secured to a single drum or output member 40 of a motor drive unit 42. The cables 38 are attached to either side of the drum 40 such that while one cable 38 is unwrapped from the drum 40 the other cable wraps around the drum 40. Alternatively, the drum 40 may be formed from two drums that are secured to each other by a spring biasing means in order to provide tension to the cables 38 as the hinge assembly travels within the guide track. In yet another alternative embodiment, the drum 40 is configured to have drums of varying dimensions or diameters wherein a smaller diameter portion is used to provide a greater torque to the cable. The smaller diameter is contemplated for use during the closing or latching portion of door travel wherein higher forces are preferred.

The cables 38 also pass through the conduits 44 and 46. The conduits 44 and 46 extend out from the housing of motor drive unit 42 in opposite directions. The conduits 44 and 46 provide a means for protecting the cables 38 from being damaged or interfered with as they wrap onto and off of cable drum 40. Disposed at either end of the track is a pair of cable pulleys 48 and 50. The pulleys 48 and 50 are rotatably mounted to the ends of the track 26. The pulleys 48 and 50 allow the cable to transition from the conduit into the channels of the track 26 and ultimately to the tensioners or alternatively the cables 38 are directly secured to a portion of the hinge 28. In yet another alternative embodiment, and in lieu of spring tensioners 56 and 58, either or both pulleys 48 and 50 can be secured to the guide track by a member movably connected to the guide track wherein a biasing member applies a biasing force to the pulley or the member the pulley is mounted to as the hinge assembly transitions through the guide track. The cables extend out to either side of the lower roller hinge where they are attached to the same through spring tensioners 56 and 58. An intended purpose of the tensioners 56 and 58 is to allow for the carrying length of cable needed throughout the sliding door's travel, especially through the bend in the track (e.g., the bend portion of the track necessary to transition the sliding door into its fully closed position). The purpose of the tensioners 56 and 58 is to allow for a varying length of cable needed throughout the sliding door's travel, especially through the bend in the track where increased forces may be required to pull the door into a locked position. The pulleys 48 and 50 are disposed within the pulley housings 52 and 54, respectively. The housings 52 and 54 enclose and protect the pulleys and the cable from debris and contaminates that may affect performance of the same (e.g., increase resistance or cause undesirable noise or vibrations).

Accordingly, the cable pulleys 48 and 50 provide a means for guiding and completing the cable loop which causes the desired movement of the hinge. As discussed above, the movement of the hinge 28 is facilitated by winding one of the cables onto the cable drum while allowing the other cable to unwind therefrom thus, allowing the hinge to slide within the track.

The motor drive unit 42 provides the necessary driving force for the modular system 24. More particularly, the motor drive unit 42 provides the force for rotating the cable drum 40 in order to effect the desired movement of the hinge 28 and ultimately the sliding door 14. In accordance with an exemplary embodiment, the motor drive unit 42 is configured to have a height profile not greater than the height profile of the track 26. Thus, the exemplary embodiment disclosed herein requires no additional vehicle space as would be required for only the track 26 and the hinge disposed therein. Moreover, the modular drive unit 24 is easily installed in its operative location, as the height of the unit 24 is the same as a receiving cavity 84 formed in the vehicle body 86 for use of track 26. This is accomplished by providing a compact motor drive unit that is capable of generating the required torque or force to rotate the cable drum 40. However, it is also contemplated in applications where there is additional room for installation of the modular unit, the motor drive unit housing may be slightly larger than the guide track. In order to reduce the profile of the motor drive unit 42, a sensor assembly 80 that is used for monitoring the position, speed and direction of the vehicle door is internally incorporated into the housing to reduce the profile of the unit 42. However, since it is desirable to provide a low profile housing and there is not significant room in the internal cavity of the housing, it is thus desirable to provide a small sensor assembly 80 that provides an accurate output.

Referring to FIG. 3, an exemplary embodiment of the motor drive unit 42 is illustrated. As illustrated, the motor drive unit 42 comprises a motor 60 for driving a shaft having a worm gear 62. The worm gear 62 is configured to threadingly engage a gear or input member 64. The gear 64 is rotatably mounted upon a shaft 68 rotatably received within an internal cavity defined by the housing of the motor drive unit. Thus, the gear 64 is capable of rotational movement about the shaft 68. In accordance with an exemplary embodiment, the shaft 68 is rotatably received in the housing by for example a pair of bearing arrangements, wherein the shaft 68 is perpendicularly positioned with respect to the driving member or shaft of the motor comprising a worm gear 62 configured for engaging the gear 64. Of course, other (non-perpendicular) angular configurations between the gear 64 and the shaft 68 are contemplated.

The motor drive unit 42 further comprises an electromagnetic clutch for coupling and uncoupling gear or input member 64 to the shaft 68 via a rotor 72 fixedly secured to the shaft 68 wherein the electromagnetic clutch is activated for powered movement of the vehicle door 14. Thus, once the gear 64 is electromagnetically coupled to the rotor 72, rotation of the gear 64 causes rotation of the shaft 68, and when the gear is no longer secured or electromagnetically coupled to the rotor 72, the gear 64 can rotate freely about the shaft 68. In other words, when the electromagnetic clutch is not engaged, the rotor 72 and the shaft 68 can freely rotate while the gear 64 remains stationary. As is known in the related arts, an electromagnetic clutch comprises a stationary coil 70 for generating an electromagnetic field in order to couple or uncouple a first frictional surface or rotor 72 to another frictional surface or armature or other equivalent item 73. Accordingly, the motor drive unit 42 provides electro/mechanical transmission of torque via mechanical engagement, which is facilitated through an excitation provided to the coil 70. In order to actuate the clutch, a voltage/current is applied to the coil 70, and the coil 70 becomes an electromagnet and produces magnetic lines of flux. The flux is then transferred through a small air gap between the coil 70 and a rotor 72. A portion of the rotor 72 becomes magnetized and sets up a magnetic loop that attracts an armature 73 so as to apply a frictional force at contact. In accordance with an exemplary embodiment, the coil 70, the rotor 72 and the armature 73 are configured such that the magnetic lines of flux do not pass through the teeth of the rotor 72 disposed about the circumference of the rotor.

As shown, and in accordance with an exemplary embodiment, the rotor 72 is fixedly secured to the shaft 68 and armature 73 is fixedly secured to gear 64, which rotates freely about shaft 68. Thus, rotation of the shaft 68 without the coil 70 being provided with an excitation will cause rotation of rotor 72 and output gear or cable drum 40 while the gear 64 and the armature 73 are rotatably mounted upon the shaft 68. Accordingly, the shaft 68 is capable of being driven by rotation of the drum 40 (e.g., sliding of the door or pivoting of the lift gate) when the coil is not provided with an excitation and the armature of the gear 64 is not engaging the rotor 72.

Accordingly, the motor 60 will drive or rotate the gear 64 and the cable drum will not be rotated by the motor until the coil 70 is provided with an excitation and the electromagnetic field or magnetic flux generated by the coil 70 draws the armature 73 towards the rotor 72 as is known in the related arts. Thus, when the electromagnetic clutch is engaged the door can be powered open or closed by the motor 60. When the clutch is released or the electromagnetic clutch is not engaged the door can be moved freely because the cable drum is allowed to move freely as there will be no frictional engagement between the two friction plates. Operation of the motor and the electromagnetic clutch to open and close the vehicle sliding door is facilitated by a controller in operable communication with the necessary components of the motor drive unit.

Although not specifically shown, it is contemplated that motor drive unit 42 can be used to open and close a vehicle lift gate.

In addition and in an exemplary embodiment, the rotor 72 further comprises a plurality of ferrous teeth 75 disposed about the circumference of the rotor. The plurality of teeth 75 are configured to provide a means for determining the speed and direction of rotation of the rotor as a sensor assembly 80 is secured to the housing in a facing spaced relationship with respect to the teeth 75 of the rotor 72. The direction of rotation of the rotor 72 and its speed is used to determine the movement and position of the vehicle door 14, which is coupled to the rotor 72 via the shaft 68, output member or cable drum 40, cables 38 and the hinge assembly. In addition, sensor assembly 80 can also be used to determine if an obstacle is preventing movement of the vehicle door. The sensor assembly 80 will provide signals indicative of movement of the rotor 72, which may be attributable to manual movement of the door or powered movement of the door by the motor when the electromagnetic clutch is engaged. This is due to the fact that the rotor 72 will rotate in either the manual or power mode and the gear 64 is rotationally mounted about shaft 68. Movement, direction and speed of the door is determined by monitoring the movement of the rotor, wherein signals indicative of rotor movement and speed are inputted into a control algorithm comprising logic for converting the rotor movement and speed into vehicle door movement, location and speed.

Figure 4:
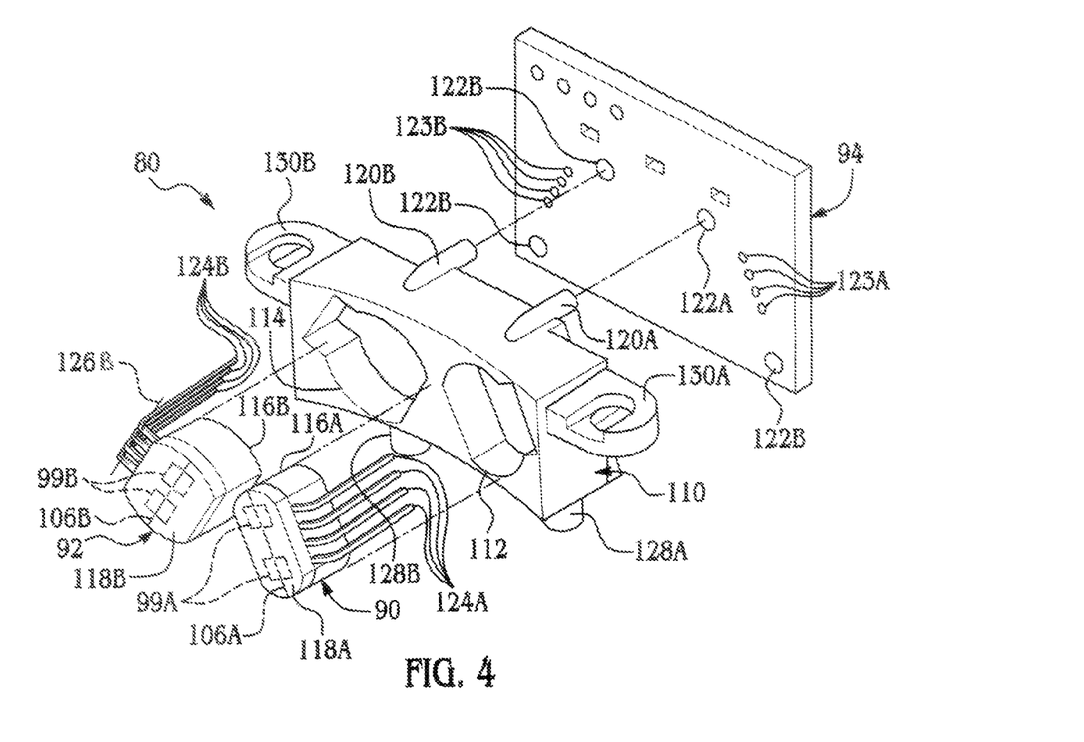
FIG. 4 is an exploded perspective view of a sensor assembly having first and second Hall effect sensor modules for detecting closely spaced teeth utilized in the drive assembly of FIG. 2 in accordance with an exemplary embodiment.
Figure 7:
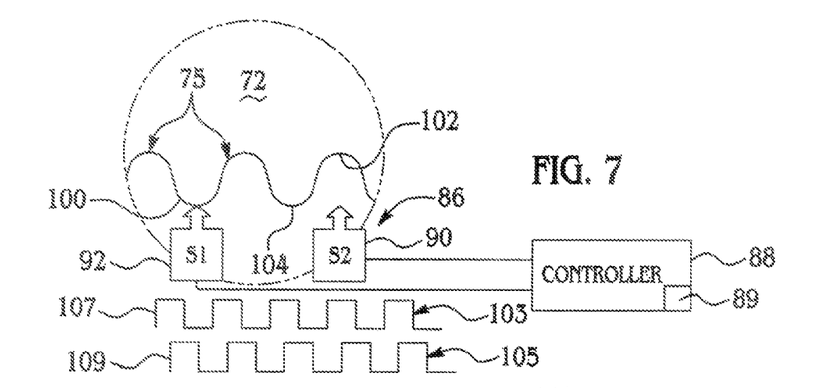
FIG. 7 is a schematic of the first and second Hall effect sensor modules and first and second signals generated by the first and second Hall effect sensor modules, respectively.

Referring to FIGS. 4 and 7, the sensor assembly 80 is provided to generate two output signals having a quadrature relationship with one another that are indicative of position, speed and direction of a rotor and further indicative of the position, speed and direction of the vehicle door 14. The two output signals are provided to a controller 88 or system having a microprocessor, microcontroller or other equivalent processing device capable of executing commands of computer readable data or program for executing a control algorithm. In order to perform the prescribed functions and desired processing, as well as the computations therefore (e.g., determining the movement, direction and speed of the vehicle door as well as operating the electromagnetic clutch and the motor), the controller 88 may include, but not be limited to, a processor(s), computer(s), memory, storage, register(s), timing, interrupt(s), communication interfaces, and input/output signal interfaces, as well as combinations comprising at least one of the foregoing. For example, the controller 88 may include input signal filtering to enable accurate sampling and conversion or acquisitions of such signals from communications interfaces. As described above, exemplary embodiments of the present invention can be implemented through computer-implemented processes and apparatuses for practicing those processes. Movement, direction and speed of the door is important as most power sliding door systems or power lift gates are operated by a control system wherein various inputs are required for proper operation. The sensor assembly 80 includes Hall effect sensor modules 90, 92, a housing 110, and a circuit board 94.

Referring to FIG. 7, the signals generated by the Hall effect sensor modules 90, 92 will now explained in further detail. In particular, the Hall effect sensor module 90 generates a signal 103 in response to the plurality of teeth 75 of the rotor 72 rotating past the Hall effect sensor module 90. Further, the Hall effect sensor module 92 generates a signal 105 in response to the plurality of teeth 75 of the rotor 72 rotating past the Hall effect sensor module 92. When arising edge 107 of the signal 103 is leading a rising edge 109 of the signal 105, the rotor 72 is rotating in a clockwise direction. Alternately, when a rising edge 109 of the signal 105 is leading a rising edge 107 of the signal 105, the rotor 72 is rotating in a counter-clockwise direction. Accordingly, the controller 88 monitors the rising edges of the signals 103, 105 to determine whether the rotor 72 is rotating in a clockwise direction or a counterclockwise direction and stores data corresponding to the rotational direction in a memory device 89. Further, the controller 88 can calculate a rotational speed of the rotor 72 based on a frequency of either the signal 103 or the signal 105 and store data corresponding to the rotational speed in the memory device 89. It should be noted that the signals 103, 105 have a quadrature relationship with one another. For purposes of understanding, the term "quadrature relationship" means a relation between two periodic signals when a phase difference between them is one-fourth of a period.

Figure 5:
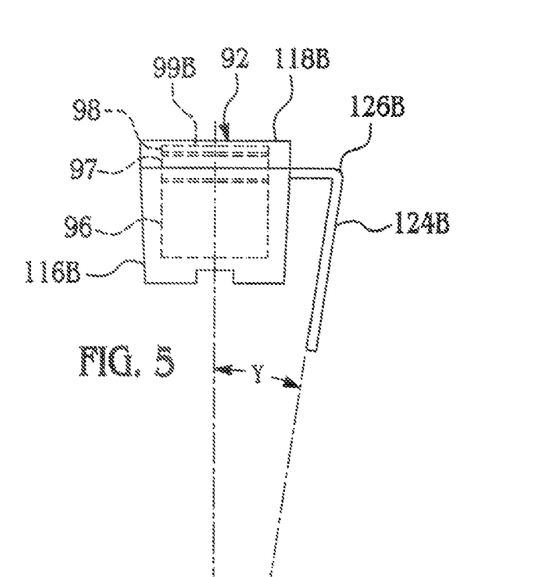
FIG. 5 is another schematic of the first Hall effect sensor module of FIG. 4.

Referring now to FIGS. 4 and 5, and in accordance with an exemplary embodiment, the sensor assembly 80 includes a Hall effect sensor module 90 spaced apart from a Hall effect sensor module 92. The sensor assembly 80 senses the ferrous teeth 75 of the rotor 72 (shown FIG. 6) rotating past the Hall effect sensor modules 90, 92 and generates two output signals indicative of a direction and speed of the rotor 72.

The Hall effect sensor module 90 includes a stationary magnet 96, a ferrous pole piece 97 and a Hall effect integrated circuit (IC) 98 with a pair of Hall effect sensor elements 99B configured to the magnetic circuit for signal processing in response to magnetic signals created by the presence of the ferrous rotor teeth 75 or lack thereof. Hall effect sensor module 92 has a substantially similar structure as Hall effect sensor module 90.

Referring to FIG. 7, the Hall effect sensor modules 90, 92 are spaced apart by a predetermined distance around the circumference of the rotor 72. The pair of Hall effect sensor elements 99A of the Hall effect sensor module 90 are configured to detect tooth peaks and tooth valleys defined by the plurality of teeth 75 on the rotor 72. Similarly, the pair of Hall effect sensor elements 99B of the Hall effect sensor module 92 are configured to detect tooth peaks and tooth valleys defined by the plurality of teeth 75 on the rotor 72. The pair of Hall effect sensor elements 99A of the Hall effect sensor module 90 are spaced apart from the pair of Hall effect sensor elements 99B of the Hall effect sensor module 92 by a predetermined distance. In one exemplary embodiment, the predetermined distance is equal to a multiple of a tooth pitch between adjacent teeth plus one-quarter of a width of a tooth. Of course, other predetermined distances are contemplated to be within the scope of exemplary embodiments of the present invention. The resultant differential output signals provide speed and direction information of the rotor 72 to a controller 88 associated with the power sliding door or power lift gate system.

Figure 8:
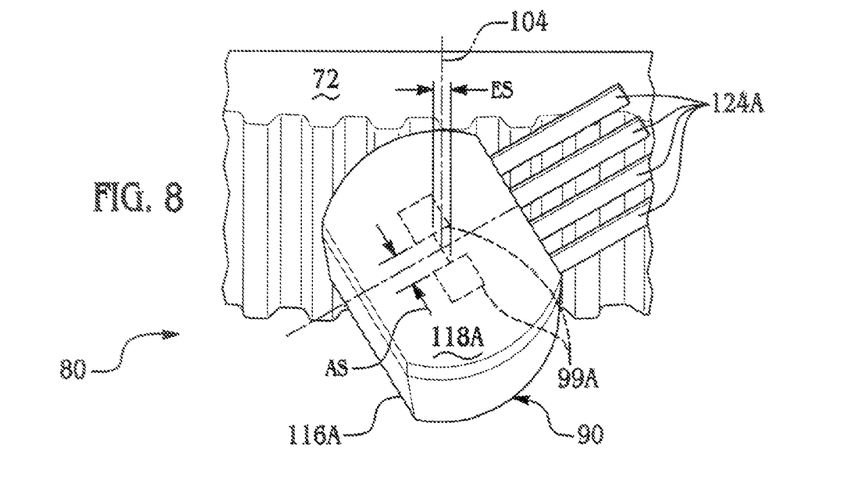
FIG. 8 is an enlarged schematic of a portion of the rotor and the sensor assembly of FIG. 6.
Figure 9:
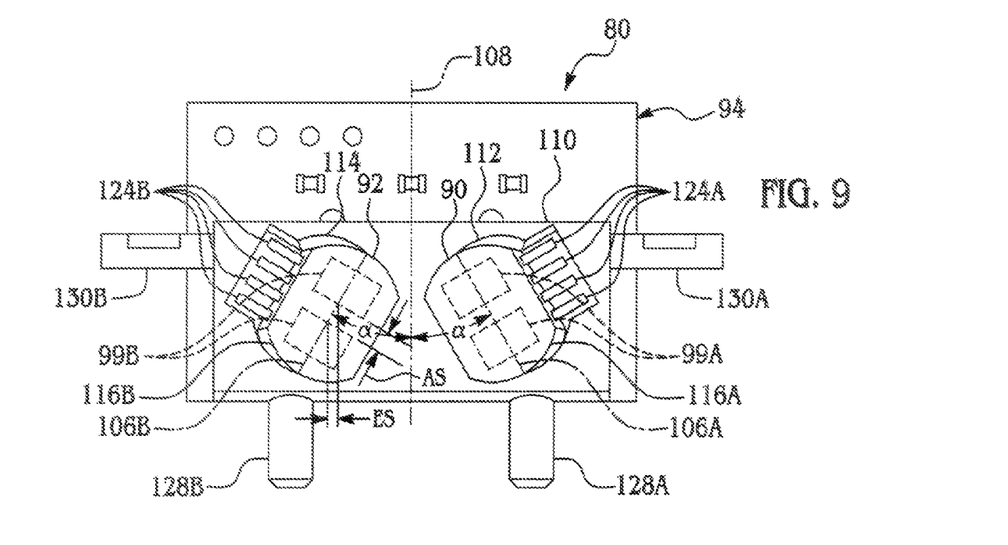
FIG. 9 is a front view of the sensor assembly of FIG. 4.

Referring to FIGS. 8 and 9, the Hall effect sensor elements 99A, 99B of Hall effect sensor modules 90, 92, respectively, are positioned so as to increase sensitivity of the sensor elements and to detect the closely spaced teeth of the rotor 72. In particular, the Hall effect sensor elements 99A of the Hall effect sensor module 90 are centered on an axis 106A and have an actual spacing (AS) therebetween along the axis 106A. The actual spacing (AS) is for example 2.2 mm for the above referenced part. The effective spacing (ES) between the Hall effect sensor elements 99A of the Hall effect sensor module 90 can be reduced with respect to an advancing line 108 which represents a leading edge 104 of a tooth of the rotor 72. The effective spacing (ES) can be reduced by positioning the Hall effect sensor module 90 so that the axis 106A is at a predetermined angle with respect to the advancing line 108.

The Hall effect sensor module 92 can be positioned in a similar manner as the Hall effect sensor module 90 relative to the advancing line 108.

In one exemplary embodiment, the Hall effect sensor elements 99A of the Hall effect sensor module 90 are positioned at an angle (α) equal to 30° with respect to the advancing line 108 representing the leading edge 104 of a tooth of the rotor 72, to thereby effectively foreshorten the distance between Hall effect sensor elements 99A along the periphery of the rotor 72 by the sine (30°). For example, according to the geometric properties of a 30-60-90 degree triangle, an actual spacing (AS) of 2.2 mm is reduced to an effective spacing (ES) of 1.1 mm along the circumference of the rotor 72. The sensor design solved the problem of detecting closely spaced gear teeth in both PSD and PLG applications and could be adapted to detect rotating gear teeth in many other applications.

The motor speed sensor described herein is contemplated for use in power sliding door (PSD) and the power lift gate (PLG) systems.

Information about the speed and direction of the drive motor is used by the electronic control unit 88 (ECU) to control the system and to detect obstacles.

Referring to FIG. 4, the sensor assembly 80 further includes a housing 110 with a receiving cavity 112 and a receiving cavity 114. The receiving cavity 112 holds and positions the Hall effect sensor module 90, and the receiving cavity 114 holds and positions the Hall effect sensor module 92. The Hall effect sensor modules 90, 92 with the Hall effect sensor elements 99A, 99B are, for example, devices sold by Allegro MicroSystems, Inc. of Worcester, Mass., under the part number ATS665LSG.

Figure 6:
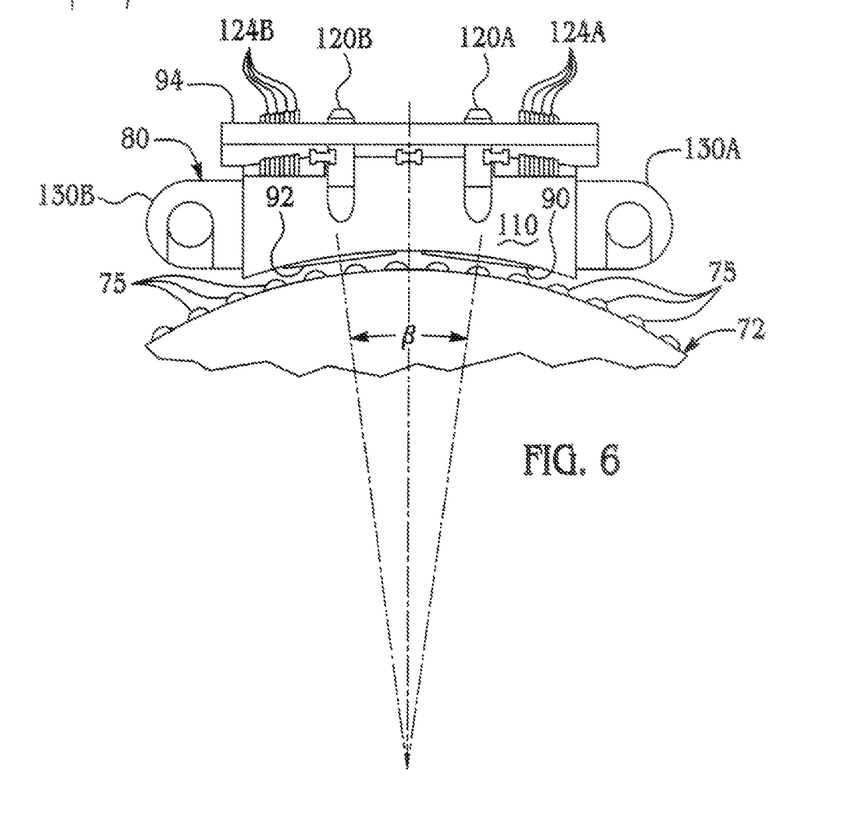
FIG. 6 is a schematic of a rotor and a sensor assembly utilized in the drive assembly of FIG. 2.

The Hall effect sensor modules 90, 92, have two pairs of spaced apart Hall effect sensor elements 99A, 99B, respectively, molded into the plastic housings 116A, 116B, respectively. The housings 116A, 116B define positioning surfaces 118A, 118B for the Hall effect sensor modules 90, 92, respectively. The positioning surfaces 118A, 118B, and Hall effect sensor elements 99A, 99B are positioned tangent to and spaced from the tips of the teeth of the rotor 72 approximately 0-2.5 mm. Each of the Hall effect sensor modules 90, 92 are positioned in a plane defined by the respective modules positioning surfaces 118A, 118B. As shown in FIG. 6, the Hall effect sensor elements 99A, 99B are positioned tangent to the rotor 72 such that the planes defined by the positioning surfaces 118A, 118B intersect at an angle β of 15° or the radial spacing of the Hall effect sensor modules 90, 92. Preferably the angle β is selected so that the spacing between the Hall effect sensor elements 99A, 99B result in the signals from the Hall effect sensor modules 90, 92 having a quadrature relationship with one another. The quadrature relationship is obtained when the spacing between the Hall effect sensor modules 90, 92 is equal to a multiple of a pitch between adjacent teeth of the plurality of teeth in the rotor 72 plus one-quarter of a width of a tooth of the rotor 72.

Figures 10, 11:
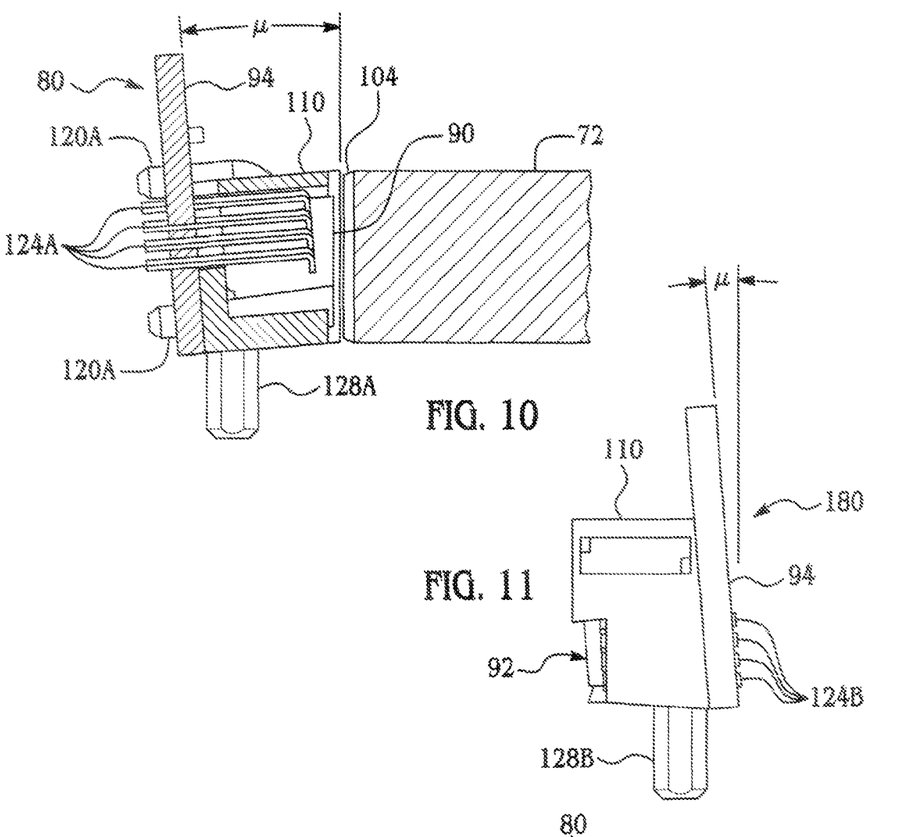
FIG. 10 is a cross-sectional schematic of a portion of the sensor assembly of FIG. 9.
FIG. 11 is a schematic of an alternative sensor assembly in accordance with another exemplary embodiment.

Referring to FIG. 10, to achieve simple and cost-effective sensor assembly 80, a mounting bracket is mounted to the circuit board 94 at a determined angle (μ) by protrusions 120A, 120B that can be heat staked and pass through holes 122A, 122B respectively in the circuit board 94. Group of leads 124A, 124B extend from the plastic housings of the Hall effect sensor modules 90, 92, respectively, and extend perpendicularly through the groups of holes 123A, 123B, respectively, in the circuit board 94 so as to intersect at right angles the planar circuit board 94. Further, the groups of leads 124A, 124B initially extend from the plastic housings 116A, 116B of the Hall effect sensor modules 90, 92, respectively, parallel to the positioning surfaces 118A, 118B of the Hall effect sensor modules 90, 92, respectively. Each of the groups of leads 124A, 124B are bent about respective axes 126A, 126B, respectively in the planes of the respective leads that are parallel to the axes 106A, 106B, respectively. The bend angle (γ) is 98.64° groups of leads 124A, 124B of the Hall effect sensor modules 90, 92 are perpendicular to a plane defined by the circuit board 94. The circuit board 94 is positioned at an angle (μ) of 4.30° with respect to a plane tangent to the rotor 72 at the advancing line 108 between the Hall effect sensor modules 90, 92.

The housing 110 incorporates positioning posts 128A, 128B that are mounted to the gear housing (not shown) and mounting ears 130A, 130B to allow the housing 110 to be attached by screws (not shown) to portions of the gear housing (not shown).

Figure 12:
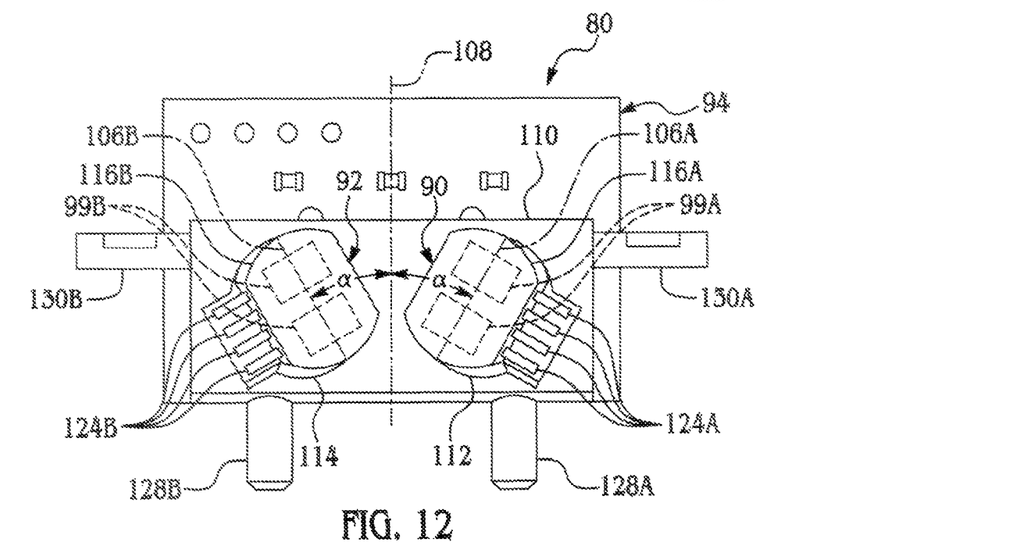
FIG. 12 is another schematic of the sensor assembly of FIG. 11.

Referring to FIGS. 11 and 12, a sensor assembly 180 in accordance with another exemplary embodiment is illustrated. The sensor assembly 180 is identical to the sensor assembly 80 except that the axes 106A, 106B have been rotated 60° relative to the advancing line 108 and the circuit board 94 now tilts toward, not away from, the plane tangent to the rotor 72 at the line 108 between the Hall effect sensor modules 90, 92. The bend angle (γ) remains 98.64° and the group of leads 124A, 124B of both sensors are perpendicular to the plane defined by the circuit board 94 that is tipped at an angle (μ) of −4.30°. Essentially the same arrangement can be achieved by simply inverting the sensor assembly 80.

The angle (μ) is still defined as the angle of printed circuit board tilt required to allow the sensor leads to align perpendicular to the face of the printed circuit board providing a standard through hole assembly and solder joint. However, because the sensor has been turned upside down the sign of the angles is reversed and is now calculated as follows:

$$\mu = \left(\mathrm{Tan}^{-1}\frac{\cos(\gamma-90)}{co(\alpha)\sin(\gamma-90)\cos\left(\frac{\beta}{2}\right)}\right)-90°$$

Example:

$$\mu = \left(\mathrm{Tan}^{-1}\frac{\cos(98.64-90)}{\cos(30)\sin(98.64-90)\cos\left(\frac{18}{2}\right)}\right)-90° = -4.30°$$

It should be understood that the spacing of the Hall effect sensor modules 90, 92 in the circumferential direction and therefore the angle α as well as the angle of rotation (β) of the individual sensors in the plane of the positioning surface are design variables which may be optimized for a particular gear tooth sensor assembly. Further, it is to be understood that the angles (γ) to which the group of leads 124A, 124B are bent and the angle (μ) of the circuit board with respect to a plane tangent to the rotor 72 at a point midway between the Hall effect sensor modules 90, 92 are derived values selected to achieve the end condition that the leads 124A, 124B are perpendicular to the circuit board 94 and thus easily inserted into the circuit board.

It should be understood that the angle (β) is selected so that the individual Hall effect sensor elements 99A, 99B are tangent to the rotor 72, and the angle α is selected to adjust the effective spacing (ES) between the individual Hall effect sensor elements 99A, 99B of the Hall effect sensor modules 90, 92, respectively. The angles (β) and (α) are both nonzero such that the circuit board angle (μ) is also nonzero.

It should be understood that the sensor assembly 80 has the advantage that it uses standard sensors to determine the direction and speed of rotation of a gear. Further, the effective spacing between two or more Hall effect sensor elements 99A, 99B within each of the Hall effect sensor modules 90, 92 can be readily adjusted by design of the mounting. Further, the spacing of the Hall effect sensor modules 90, 92 can be selected such that the signals from the Hall effect sensor modules 90, 92 have a quadrature relationship with one another which enables a controller to determine the direction of rotation of the gear.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A drive assembly for a vehicle door, comprising:
   a motor having a driving member;
   a housing having a shaft rotatably received therein;
   an input member being rotatably received upon the shaft, the input member being operatively associated with the driving member, and rotation of the driving member causing rotation of the input member;
   an armature mounted on the input member;
   a rotor fixedly secured to the shaft, the rotor being cylindrical in shape and having a plurality of teeth positioned along a periphery of the rotor, the plurality of teeth being positioned in an equidistant manner and defining a plurality of tooth valleys and a plurality of tooth peaks, the plurality of tooth peaks and the plurality of tooth valleys being arranged in an alternating manner;
   a coil mounted to the housing, the coil providing magnetic flux lines through the rotor to attract the armature when the coil is provided with an excitation thereby coupling the input member to the rotor; and
   a first Hall effect sensor module mounted to the housing in a facing spaced relationship with respect to the plurality of teeth of the rotor, the first Hall effect sensor module having first and second Hall effect sensor elements, the first and second Hall effect sensor elements being spaced apart from one another and centered along a first axis, the first axis being at a first predetermined angle with respect to leading edges of the plurality of teeth of the rotor, the first and second Hall effect sensor elements cooperating with one another to generate a first signal indicating whether one of the plurality of tooth peaks or one of the plurality of tooth valleys are detected; and
   a second Hall effect sensor module mounted to the housing in a facing spaced relationship with respect to the plurality of teeth of the rotor, the second Hall effect sensor module having third and fourth Hall effect sensor elements, the third and fourth Hall effect sensor elements being spaced apart from one another and centered along a second axis, the second axis being at a second predetermined angle with respect to leading edges of the plurality of teeth, the third and fourth Hall effect sensor elements cooperating with one another to generate a second signal indicating whether one of the plurality of tooth peaks or one of the plurality of tooth valleys are detected, wherein the first and second signals have a quadrature relationship with respect to one another and indicate a rotational direction of the rotor when the plurality of teeth are rotating past the first and second Hall effect sensor modules.

2. The drive assembly of claim 1, wherein a frequency of the first signal is further indicative of a rotational speed of the rotor.

3. The drive assembly of claim 1, wherein the first Hall effect sensor module is spaced away from the second Hall effect sensor module a distance equal to a multiple of a pitch between adjacent teeth of the plurality of teeth plus one-quarter of a width of a tooth of the plurality of teeth.

4. The drive assembly of claim 1, further comprising a controller operably coupled to the first and second Hall effect sensor modules, the controller configured to determine a rotational direction of the rotor based on the first and second signals and to store data corresponding to the rotational direction in a memory device.

5. A modular system for a vehicle door, comprising;
   a track;
   a door hinge slidably attached to the track; and
   a drive assembly moving the door hinge along the track;
   the drive assembly comprising:
   a motor having a driving member;
   a housing having a shaft rotatably received therein;
   an input member being rotatably received upon the shaft, the input member being operatively associated with the driving member, wherein rotation of the driving member causes rotation of the input member;
   an armature mounted on the input member;
   a rotor fixedly secured to the shaft, the rotor being cylindrical in shape and having a plurality of teeth positioned along a periphery of the rotor, the plurality of teeth being positioned in an equidistant manner and defining a plurality of tooth valleys and a plurality of tooth peaks, the plurality of tooth peaks and the plurality of tooth valleys being arranged in an alternating manner;
   a coil mounted to the housing, the coil providing magnetic flux lines through the rotor to attract the armature when the coil is provided with an excitation thereby coupling the input member to the rotor; and
   a first Hall effect sensor module mounted to the housing in a facing spaced relationship with respect to the plurality of teeth of the rotor, the first Hall effect sensor module having first and second Hall effect sensor elements, the first and second Hall effect sensor elements being spaced apart from one another and centered along a first axis, the first axis being at a first predetermined angle with respect to leading edges of the plurality of teeth of the rotor, the first and second Hall effect sensor elements cooperating with one another to generate a first signal indicating whether one of the plurality of tooth peaks or one of the plurality of tooth valleys are detected; and
   a second Hall effect sensor module mounted to the housing in a facing spaced relationship with respect to the plurality of teeth of the rotor, the second Hall effect sensor module having third and fourth Hall effect sensor elements, the third and fourth Hall effect sensor elements being spaced apart from one another and centered along a second axis, the second axis being at a second predetermined angle with respect to leading edges of the plurality of teeth, the third and fourth Hall effect sensor elements cooperating with one another to generate a second signal indicating whether one of the plurality of tooth peaks or one of the plurality of tooth valleys are detected, wherein the first and second signals have a quadrature relationship with respect to one another and indicate a rotational direction of the rotor when the plurality of teeth are rotating past the first and second Hall effect sensor modules.

6. The modular system of claim 5, wherein a frequency of the first signal is further indicative of a rotational speed of the rotor.

7. The modular system of claim 5, wherein the first Hall effect sensor module is spaced away from the second Hall effect sensor module a distance equal to a multiple of a pitch between adjacent teeth of the plurality of teeth plus one-quarter of a width of a tooth of the plurality of teeth.

8. The modular system of claim 5, wherein the drive assembly further comprises a controller operably coupled to the first and second Hall effect sensor modules, the controller configured to determine a rotational direction of the rotor based on the first and second signals and to store data corresponding to the rotational direction in a memory device.

* * * * *